United States Patent [19]
White

[11] Patent Number: 5,550,866
[45] Date of Patent: Aug. 27, 1996

[54] DIGITAL DEMODULATOR REFERENCE SIGNAL GENERATOR HAVING DC BLOCKER AND FIRST HILBERT TRANSFORMATION WITH QUADRATURE OUTPUT FOLLOWED BY GAIN STAGING AND COMBINATION FOR SECOND HILBERT TRANSFORMATION QUADRATURE OUTPUT

[75] Inventor: Stanley A. White, San Clemente, Calif.

[73] Assignee: Rockwell International Corporation, Seal Beach, Calif.

[21] Appl. No.: 316,143

[22] Filed: Sep. 30, 1994

[51] Int. Cl.⁶ .................................................. H04L 27/22
[52] U.S. Cl. .................. 375/316; 375/346; 375/340; 375/281; 375/324; 329/304; 329/345
[58] Field of Search ................................ 375/316, 319, 375/320, 322, 324, 325, 329, 340, 345, 346, 348, 349, 350, 362, 354, 364, 261, 269, 281, 284, 285, 351; 329/304, 305, 306, 309, 310, 345, 346, 347, 356, 358, 361, 363, 371

[56] References Cited

U.S. PATENT DOCUMENTS 5,406,587  11/1995  Horwitz et al. ........................ 375/340

*Primary Examiner*—Wellington Chin
*Assistant Examiner*—William Luther
*Attorney, Agent, or Firm*—George A. Montanye; Charles T. Silberberg; Tom Streeter

[57] ABSTRACT

Information often modulates an underlying carrier signal, thereby producing a modulated information signal 70. This same carrier signal is required, with a few modifications, to demodulate the modulated information signal. This required signal is called the demodulator reference signal. It must be complex, that is, it must contain separate in-phase and quadrature outputs. A degraded version 10 of this signal is often available with the correct frequency, but with the wrong phase and amplitude, and with a direct current (dc) offset. The present invention 68 produces a digital demodulator reference signal 38, 46 from the degraded signal 10. It eliminates dc offset with a dc blocker 18, adjusts amplitude with a scaler 14, adjusts phase with a first Hilbert transformer 20, multipliers 26 and 28 and summer 34, and produces in-phase and quadrature outputs with a second Hilbert transformer 36 cascaded with the first.

16 Claims, 3 Drawing Sheets

5,550,866

DIGITAL DEMODULATOR REFERENCE SIGNAL GENERATOR HAVING DC BLOCKER AND FIRST HILBERT TRANSFORMATION WITH QUADRATURE OUTPUT FOLLOWED BY GAIN STAGING AND COMBINATION FOR SECOND HILBERT TRANSFORMATION QUADRATURE OUTPUT

CROSS REFERENCE TO RELATED APPLICATIONS

This invention is related to the following of my pending applications:

| File Date | Serial No. | Title |
| --- | --- | --- |
| 07-22-93 | 08/095,781 | Angular Rate Sensing System (co-inventor: John C. Pinson) |
| 08-12-93 | 08/105,326 | Complex Digital Demodulator Employing Chebychev-Approximation Derived Synthetic Sinusoid Generation |
| 08-12-93 | 08/105,625 | Estimator of Amplitude and Frequency of a Noisy Biased Sinusoid from Short Bursts of Samples |
| 09-07-93 | 08/116,859 | Tracking Filter and Quadrature-Phase Reference Generator |
| 09-07-93 | 08/117,461 | Frequency and Phase-Locked 2-Phase Digital Synthesizer |
| 09-07-93 | 08/116,860 | Amplitude Detection and Automatic Gain Control of a Sparsely Samples Sinusoid by Adjustment of a Notch Filter |
| 09-07-93 | 08/120,871 | Amplitude Detection and Automatic Gain Control of a Sparsely Samples Sinusoid by Computation Including a Hilbert Transform |
| 09-13-93 | 08/119,637 | Self-Oscillating Driver Circuit for a Quartz Resonator of an Angular Rate Sensor |
| 09-24-93 | 08/125,890 | An Admittance-Parameter Estimator for a Piezoelectric Resonator in an Oscillator Circuit |

The disclosure of these applications is incorporated herein by reference.

BACKGROUND OF THE INVENTION

This invention relates to digital signal processing and has particular reference to generating a demodulator reference signal so that the information in an amplitude-modulated information signal may be recovered by demodulation. It most particularly relates to generating signals for the subsequent demodulation of a quadrature-amplitude-modulated (QAM) double-sideband-suppressed-carrier (DSSC) information signal.

Information often modulates an underlying carrier signal, thereby producing a modulated information signal. This same carrier signal is required, with a few modifications, to demodulate the modulated information signal. This required signal is called the demodulator reference signal. It must be complex, that is, it must contain separate in-phase and quadrature outputs.

A degraded version of this signal is often available with the correct frequency, but with the wrong phase and amplitude, and with a zero frequency or dc offset. It may well be known that a dc offset is present, and that the phase and amplitude are incorrect by known amounts. Repairing the damage quickly and cheaply, however, is more difficult than recognizing its existence.

The source of the modulated information signal may be (for example), the quartz angular rate sensor disclosed in the cross-referenced applications. The degraded modulator reference signal may come from the apparatus driving the source of the modulated information signal (as in the above-referenced quartz angular rate sensor), or it may come from the source of the modulated information signal itself.

The present invention is particularly well suited to the above-referenced quartz angular rate sensor. However, it is well suited to any application in which there is an amplitude-modulated information signal, and in which there is a degraded modulator reference signal which must somehow be upgraded enough to demodulate the amplitude-modulated information signal.

SUMMARY OF THE INVENTION

The present invention produces a digital demodulator reference signal from the degraded signal. It eliminates dc offset with a dc blocker, adjusts amplitude, adjusts phase with a first Hilbert transformer, and produces in-phase and quadrature outputs with a second Hilbert transformer cascaded with the first.

It is a feature of the present invention that only non-recursive filters are required. This allows the invention to function almost immediately after power-up, since transients pass through the invention only once.

It is another feature of the present invention that accuracy is maintained even when (inexpensive) fixed-point processing is used. Floating-point processing may also be used, if desired, and the results will generally be superior to other architectures in which floating-point processing is used.

DETAILED DESCRIPTION OF THE DRAWINGS

Figure 1:
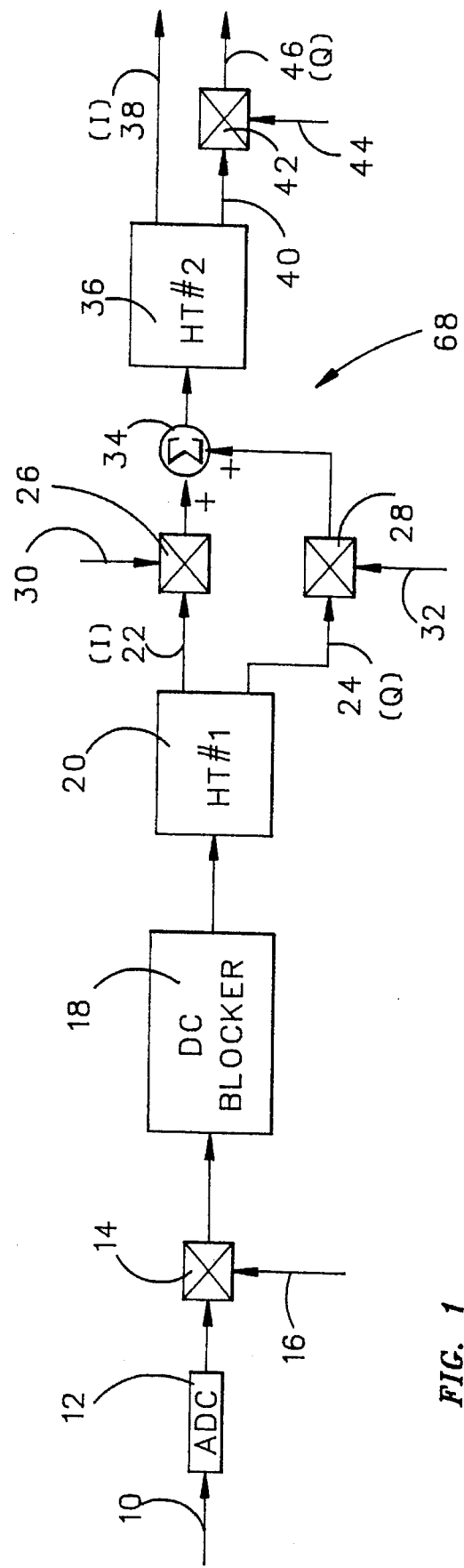
FIG. 1 is a block diagram of the present invention.

In FIG. 1, a degraded demodulator reference signal 10 is applied to an analog-to-digital converter (ADC) 12. Applicant has used an ADC 12 which produces sixteen bits of output. It is possible to attempt to eliminate dc offset from the input to the ADC 12, but the ADC 12 itself generates a non-negligible dc offset. It is more cost effective to eliminate both sources of dc offset with a downstream device.

The output of the ADC 12 is applied to one input of a scaler 14, preferably a multiplier having a second input, to which a fixed scaler multiplicand 16 is applied. A bit shifter may be used, especially in an ASIC implementation. The scaler multiplicand 16 is selected to be small enough to prevent downstream devices from overflowing, yet large enough to allow the downstream devices to operate over their full dynamic ranges. If the degraded demodulator reference signal 10 already meets these requirements, the scaler 14 may be omitted.

Figures 2, 3:
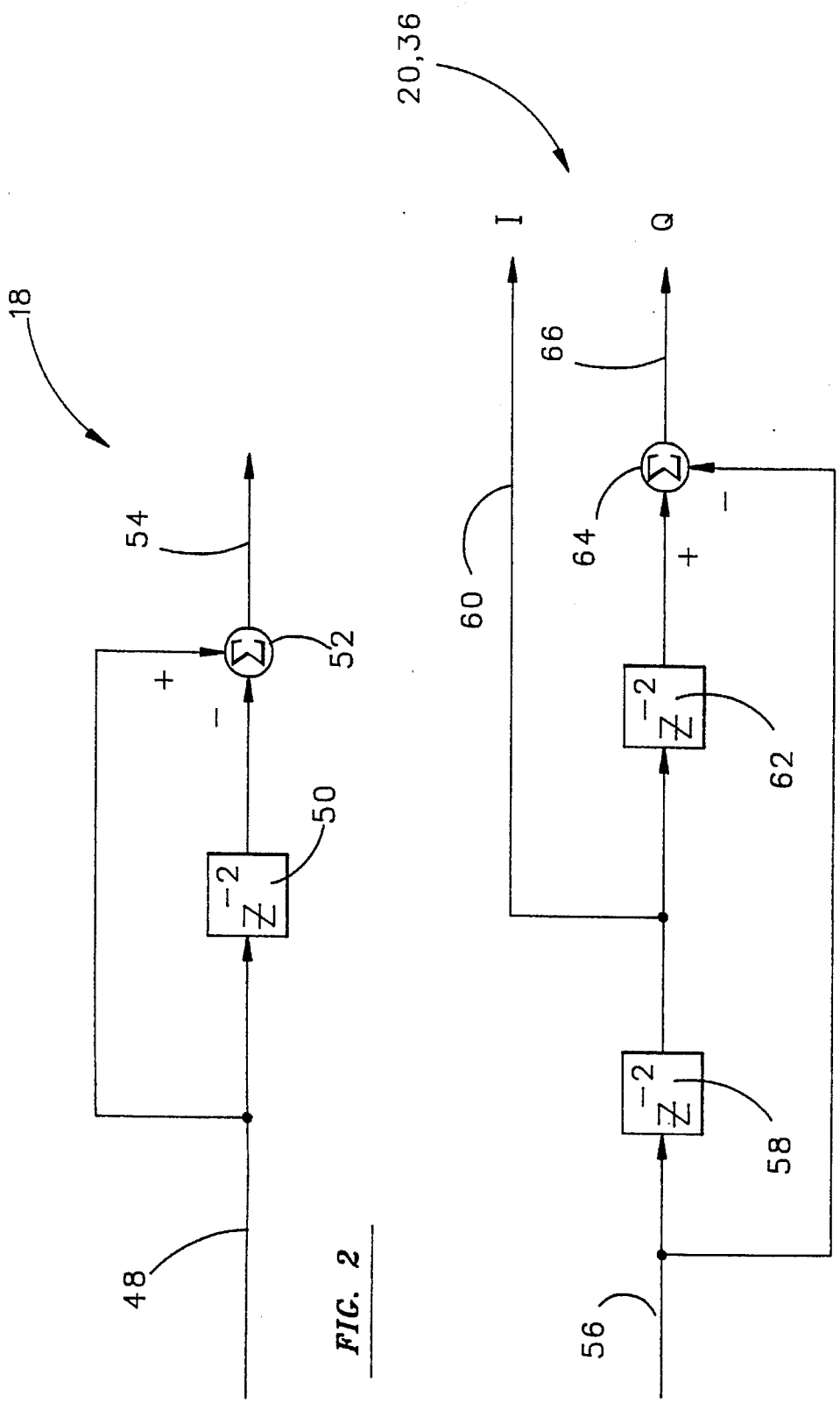
FIG. 2 is a schematic drawing of a preferred embodiment of the dc blocker of FIG. 1.
FIG. 3 is a schematic drawing of a preferred embodiment of the Hilbert transformers of FIG. 1.

The output of the scaler 14 is applied to a dc blocker 18. A preferred embodiment of dc blocker 18 is shown in FIG. 2. The output of the dc blocker 18 is applied to a first Hilbert transformer 20, a preferred embodiment of which is shown in FIG. 3. The first Hilbert transformer 20 has an in-phase output 22 and a quadrature output 24.

The in-phase output 22 is applied to a first input of an in-phase multiplier 26, and the quadrature output 24 is applied to a first input of a first quadrature multiplier 28. If scale factors could be ignored, it would be straightforward to rotate these outputs through an angle φ by a three step process. First, an in-phase multiplicand 30, equal to cos(φ), would be applied to a second input of the in-phase multiplier 26. Second, a first quadrature multiplicand 32, equal to sin(φ), would be applied to a second input of the first quadrature multiplier 32. Third, the outputs of the multipliers 26, 28 would be summed in a summer 34.

However, scale factors cannot be ignored. Let $\omega_o$ be the modulation frequency, and let T be the sampling interval. The gain of the dc blocker 18 shown in FIG. 2 will then be 2 sin($\omega_o$T). The quadrature path of the Hilbert transformer shown in FIG. 3 is essentially the same device as the FIG. 2 dc blocker 18, and also provides a gain of 2 sin($\omega_o$T). The in-phase multiplicand 30 should therefore be equal to $$\frac{\cos(\phi)}{2 \sin(\omega_o T)},$$

and the first quadrature multiplicand 32 should therefore be equal to $$\frac{\sin(\phi)}{4 \sin^2(\omega_o T)}.$$

It will be recalled that the scaler multiplicand 16 was selected, in part, to prevent overflow in the downstream components. This requirement may be relaxed: only the downstream components through the first Hilbert transformer 20 need be protected against overflow by the scaler multiplicand 16; components below the first Hilbert transformer 20 may be protected by adjusting the multiplicands 30, 32. The application to which the present invention is put may impose additional requirements on the multiplicands 16, 30, 32. It is important, in any event, to account for the gains generated by each element of the present invention.

The full dynamic range of the modulated information signal is best exploited when the modulation frequency $\omega_o$ is roughly equal to a quarter of the sampling frequency. This combination of frequencies is relatively straightforward to obtain. In this situation, sin($\omega_o$T) is approximately equal to one, and the dc blocker 18 and the quadrature path of the first Hilbert transformer 20 each produce a gain of approximately two. This full exploitation of dynamic range also allows the minimalist versions of the dc blocker 18 and of the Hilbert transformers 20, 36 which are shown in FIGS. 2 and 3 respectively. Increased frequency mismatch requires correspondingly more complicated blockers and transformers.

The exact value of the modulation frequency $\omega_o$, the exact value of the required rotation φ, and the exact value of the required scaler multiplicand 16 (whether mechanized directly or, at least in part, as multiplicands 30, 32) are generally not known when a device embodying the present invention is itself fabricated. They generally are known once the device (and its driver, if appropriate) producing the modulated information signal, and the degraded modulator reference signal, has been fabricated and tested. They may then be applied permanently to the device of the present invention, preferably in a non-volatile memory such as a ROM.

If desired, these parameters may be periodically redetermined, and the updated values may be applied to the device of the present invention. However, it is an important feature of the present invention that it does not use recursive filters, and therefore does not have long term effects from transient events such as turning the power on. Updating the values of these parameters is also a transient event, and will (at least for a few sampling intervals) result in incorrect output information. The user must determine whether the accuracy gained in re-estimating the parameters outweighs the accuracy lost in the transient of incorrect output information. It is generally preferable to use a more stable device rather than to correct for any instabilities.

Figure 4:
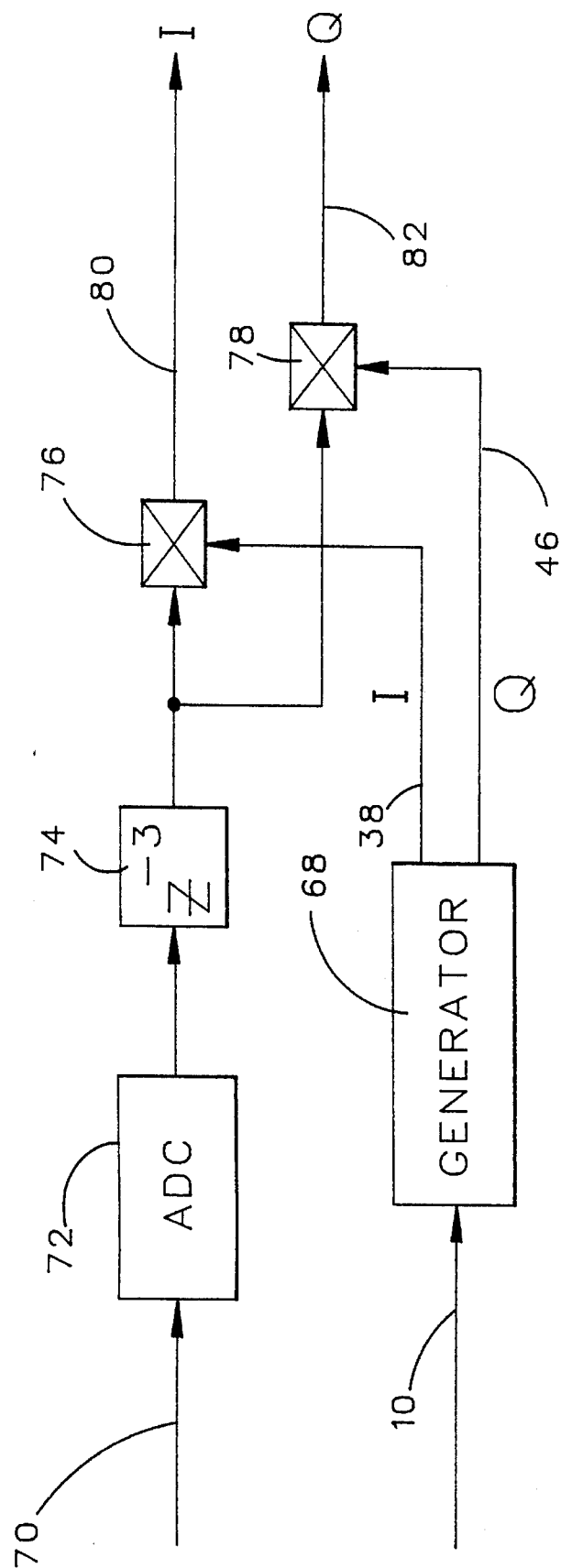
FIG. 4 is a block diagram of the present invention in operation, demodulating a modulated information signal.

Returning to FIG. 1, the output of the summer 34 is applied to a second Hilbert transformer 36, having an in-phase output 38 and a quadrature output 40. As in the first Hilbert transformer 20, appropriate allowances must be made for the gain generated in each path. If the FIG. 3 transformer is used, as is preferred, the in-phase path will have a gain of one, and no correction is required. The in-phase output 38 is the overall in-phase output of the present invention, and is ready to be applied to an in-phase demodulator (FIG. 4).

The quadrature path, however, as in the first Hilbert transformer 20, will have a gain of 2 sin($\omega_o$T). The quadrature output 40 is therefore applied to a first input of a second quadrature multiplier 42, and a second quadrature multiplicand 44, equal to $$\frac{1}{2 \sin(\omega_o T)},$$

is therefore applied to a second input of the second quadrature multiplier 42. The output 46 of the second quadrature multiplier 42 is the overall quadrature output of the present invention, and is ready to be applied to a quadrature demodulator (FIG. 4).

If downstream requirements make it desirable for the overall quadrature output 46 to have a gain which differs from that of the overall in-phase output 38, the second quadrature multiplicand 44 may be adjusted accordingly. It is often convenient to adjust the gain of the overall in-phase output 38 by adjusting the scaler multiplicand 16, and by applying an offsetting adjustment to the second quadrature multiplicand 44.

FIG. 2 shows the details of the dc blocker 18. An incoming signal 48 is applied to the input of a double delay element 50, the output of which is applied to a minus input of a summer 52. The incoming signal 48 is also applied to a plus input of the summer 52. The output 54 of the summer 52 is the output of the dc blocker 18.

FIG. 3 shows the details of the Hilbert transformers 20, 36. An incoming signal 54 is applied to the input of a first delay element 58, the output 22, 38 of which is the in-phase output of the transformer. The output 22, 38 is also applied to the input of a second delay unit 62, the output of which is applied to a plus input of a subtractor 64. The incoming signal 54 is also applied to a minus input of the subtractor 64. The output 24, 40 of the subtractor 64 is the quadrature output of the transformer.

FIG. 4 shows the present invention 68 in operation, demodulating a modulated information signal 70. The degraded modulator reference signal 10 is applied to the demodulator reference signal generator 68, the details of which are shown in FIG. 1. A modulated information signal 70 is digitized by an ADC 72. The output of the ADC 72 is delayed by a compensating delay element 74, thereby matching the delay of the generator 68. Using the structures shown in FIGS. 2 and 3, each having a one sampling period delay, the generator 68 of FIG. 1 will have a delay of three sampling periods. FIG. 4 therefore shows compensating delay element 74 as imposing the same three sampling period delay.

The output of the delay element 74 is applied to first inputs of an in-phase demodulator 76 and a quadrature demodulator 78. Second inputs of these demodulators are driven respectively by the in-phase 38 and quadrature 46 components of the demodulator reference signal. The demodulators 76, 78 thereby produce in-phase 80 and quadrature 82 components of the demodulated signal.

Conceptually, it is possible to eliminate the compensating delay element 74. The phase angle Φ can be set to allow, not only for the delays within the device producing the modulated information signal 70 and the degraded modulator reference signal 10, but also for the delay within the generator 68. Usually this minor saving in hardware is more than offset by the additional off-line computation required. The user must make this design choice based on the application at hand.

SCOPE OF CLAIMS

Several embodiments of the present invention have been described in some detail, but the true spirit and scope of the present invention are not limited thereto, but are limited only by the appended claims and their equivalents.

What is claimed is:

1. Apparatus comprising:
   (a) a first Hilbert transformer constructed to receive an input signal and to produce a first in-phase output and a first quadrature output;
   (b) a first multiplier connected to:
      (1) multiply the first in-phase output by an in-phase multiplicand which is equal to:
         (A) the cosine of a desired angle, divided by
         (B) a first gain factor; and
      (2) thereby produce a first product;
   (c) a second multiplier connected to:
      (1) multiply the first quadrature output by a quadrature multiplicand which is equal to:
         (A) the sine of the desired angle, divided by
         (B) a second gain factor; and
      (2) thereby produce a second product;
   (d) a summer connected to add together the first product and the second product and to thereby produce a sum; and
   (e) a second Hilbert transformer constructed to receive the sum and to produce a second in-phase output and a second quadrature output.

2. The apparatus of claim 1, further comprising a third multiplier connected to multiply:
   (a) a third multiplicand which is equal to the inverse of a third gain factor by
   (b) the second quadrature product;
   and to thereby produce a third product.

3. The apparatus of claim 1, further comprising a fourth multiplier connected to:
   (a) multiply:
      (1) an incoming signal by
      (2) a fourth multiplicand which is equal to the inverse of a fourth gain factor; and
   (b) thereby produce a fourth product which is applied to the first Hilbert transformer.

4. The apparatus of claim 1, further comprising a dc blocker connected to block any dc component from the first Hilbert transformer.

5. The apparatus of claim 4, further comprising a fourth multiplier connected to:
   (a) multiply:
      (1) an incoming signal by
      (2) a fourth multiplicand which is equal to the inverse of a fourth gain factor; and
   (b) thereby produce a fourth product which is applied to the dc blocker.

6. The apparatus of claim 4, wherein the dc blocker comprises:
   (a) a double delay element connected to receive an input signal to the dc blocker and to produce an output signal; and
   (b) a subtractor connected to:
      (1) receive, at a minus terminal, the output signal of the double delay element;
      (2) receive, at a plus terminal, the input signal to the dc blocker; and
      (3) produce, at an output terminal, a difference which is the output of the dc blocker.

7. The apparatus of claim 1, wherein the first and second Hilbert transformers each comprises:
   (a) a first delay element connected to:
      (1) receive an input signal to the Hilbert transformer; and
      (2) produce an output signal which is the in-phase output signal of the Hilbert transformer;
   (b) a second delay element connected to:
      (1) receive, as an input signal, the output signal of the first delay element; and
      (2) produce an output signal; and
   (c) a subtractor connected to:
      (1) receive, at a minus terminal, the input signal to the Hilbert transformer;
      (2) receive, at a plus terminal, the output signal of the second delay element; and
      (3) produce, at an output terminal, a difference which is the quadrature output signal of the Hilbert transformer.

8. Apparatus comprising:
   (a) a first multiplier connected to:
      (1) multiply:
         (A) an incoming signal by
         (B) a first multiplicand which is equal to the inverse of a first gain factor; and
      (2) thereby produce a first product;
   (b) a dc blocker comprising:
      (1) a double delay element connected to receive the first product and to produce an output signal; and
      (2) a subtractor connected to:
         (A) receive, at a minus terminal, the output signal of the double delay element;
         (B) receive, at a plus terminal, the input signal to the dc blocker; and
         (C) produce, at an output terminal, a difference which is the output of the dc blocker;
   (c) a first Hilbert transformer constructed to receive an input signal from the dc blocker and to produce a first in-phase output and a first quadrature output;
   (d) a second multiplier connected to:
      (1) multiply the first in-phase output by an in-phase multiplicand which is equal to:
         (A) the cosine of a desired angle, divided by
         (B) a second gain factor; and
      (2) thereby produce a second product;

(e) a third multiplier connected to:
   (1) multiply the first quadrature output by a quadrature multiplicand which is equal to:
      (A) the sine of the desired angle, divided by
      (B) a third gain factor; and
   (2) thereby produce a third product;
(f) a summer connected to add together the second product and the third product and to thereby produce a sum;
(g) a second Hilbert transformer constructed to receive the sum and to produce a second in-phase output and a second quadrature output; and
(h) a fourth multiplier connected to multiply:
   (1) a fourth multiplicand which is equal to the inverse of a fourth gain factor by
   (2) the second quadrature output and to thereby produce a fourth product; the first and second Hilbert transformers each comprising:
(i) a first delay element connected to:
   (1) receive an input signal to the Hilbert transformer; and
   (2) produce an output signal which is the in-phase output signal of the Hilbert transformer;
(j) a second delay element connected to:
   (1) receive, as an input signal, the output signal of the first delay element; and
   (2) produce an output signal; and
(k) a subtractor connected to:
   (1) receive, at a minus terminal, the input signal to the Hilbert transformer;
   (2) receive, at a plus terminal, the output signal of the second delay element; and
   (3) produce, at an output terminal, a difference which is the quadrature output signal of the Hilbert transformer.

9. Apparatus comprising:
(a) a first analog-to-digital converter connected to receive a degraded demodulator reference signal;
(b) a first Hilbert transformer constructed to receive an input signal from the first analog to digital converter and to produce a first in-phase output and a first quadrature output;
(c) a first multiplier connected to:
   (1) multiply the first in-phase output by an in-phase multiplicand which is equal to:
      (A) the cosine of a desired angle, divided by
      (B) a first gain factor; and
   (2) thereby produce a first product;
(d) a second multiplier connected to:
   (1) multiply the first quadrature output by a quadrature multiplicand which is equal to:
      (A) the sine of the desired angle, divided by
      (B) a second gain factor; and
   (2) thereby produce a second product;
(e) a summer connected to add together the first product and the second product and to thereby produce a sum;
(f) a second Hilbert transformer constructed to receive the sum and to produce a second in-phase output and a second quadrature output;
(g) a second analog-to-digital converter connected to receive a modulated information signal;
(h) a compensating delay element connected to receive an input signal from the second analog-to-digital converter and constructed to match the delay imposed by the apparatus of elements (b) through (f);
(i) an in-phase demodulator connected to:
   (1) receive, at a first input, an output of the compensating delay unit;
   (2) receive, at a second input, the second in-phase output of element (f); and
   (3) produce, at an output, an overall in-phase output of the apparatus; and
(j) an quadrature demodulator connected to:
   (1) receive, at a first input, the output of the compensating delay unit;
   (2) receive, at a second input, the second quadrature output of element (f); and
   (3) produce, at an output, an overall quadrature output of the apparatus.

10. The apparatus of claim 9, further comprising a third multiplier connected to multiply:
(a) a third multiplicand which is equal to the inverse of a third gain factor by
(b) the second quadrature output;
and to thereby produce a third product.

11. The apparatus of claim 9, further comprising a fourth multiplier connected to:
(a) multiply:
   (1) an input signal from the first analog-to-digital converter by
   (2) a fourth multiplicand which is equal to the inverse of a fourth gain factor; and
(b) thereby produce a fourth product which is applied to the first Hilbert transformer.

12. The apparatus of claim 9, further comprising a dc blocker connected to block any dc component from the first Hilbert transformer.

13. The apparatus of claim 12, further comprising a fourth multiplier connected to:
(a) multiply:
   (1) an input signal from the first analog-to-digital converter by
   (2) a fourth multiplicand which is equal to the inverse of a fourth gain factor; and
(b) thereby produce a fourth product which is applied to the dc blocker.

14. The apparatus of claim 12, wherein the dc blocker comprises:
(a) a double delay element connected to receive an input signal to the dc blocker and to produce an output signal; and
(b) a subtractor connected to:
   (1) receive, at a minus terminal, the output signal of the double delay element;
   (2) receive, at a plus terminal, the input signal to the dc blocker; and
   (3) produce, at an output terminal, a difference which is the output of the dc blocker.

15. The apparatus of claim 9, wherein the first and second Hilbert transformers each comprises:
(a) a first delay element connected to:
   (1) receive an input signal to the Hilbert transformer; and
   (2) produce an output signal which is the in-phase output signal of the Hilbert transformer;
(b) a second delay element connected to:
   (1) receive, as an input signal, the output signal of the first delay element; and
   (2) produce an output signal; and
(c) a subtractor connected to:

(1) receive, at a minus terminal, the input signal to the Hilbert transformer;
(2) receive, at a plus terminal, the output signal of the second delay element; and
(3) produce, at an output terminal, a difference which is the quadrature output signal of the Hilbert transformer.

16. Apparatus comprising:
(a) a first analog-to-digital converter connected to receive a degraded demodulator reference signal;
(b) a first multiplier connected to:
  (1) multiply:
    (A) an output of the first analog-to-digital converter by
    (B) a first multiplicand which is equal to the inverse of a first gain factor; and
  (2) thereby produce a first product;
(c) a dc blocker comprising:
  (1) a double delay element connected to receive the first product and to produce an output signal; and
  (2) a subtractor connected to:
    (A) receive, at a minus terminal, the output signal of the double delay element;
    (B) receive, at a plus terminal, the input signal to the dc blocker; and
    (C) produce, at an output terminal, a difference which is the output of the dc blocker;
(d) a first Hilbert transformer constructed to receive an input signal from the dc blocker and to produce a first in-phase output and a first quadrature output;
(e) a second multiplier connected to:
  (1) multiply the first in-phase output by an in-phase multiplicand which is equal to:
    (A) the cosine of a desired angle, divided by
    (B) a second gain factor; and
  (2) thereby produce a second product;
(f) a third multiplier connected to:
  (1) multiply the first quadrature output by a quadrature multiplicand which is equal to:
    (A) the sine of the desired angle, divided by
    (B) a third gain factor; and
  (2) thereby produce a third product;
(g) a summer connected to add together the second product and the third product and to thereby produce a sum;
(h) a second Hilbert transformer constructed to receive the sum and to produce a second in-phase output and a second quadrature output;
(i) a fourth multiplier connected to multiply:
  (1) a fourth multiplicand which is equal to the inverse of a fourth gain factor by
  (2) the second quadrature output; and to thereby produce a fourth product;
(j) a second analog-to-digital converter connected to receive a modulated information signal;
(k) a compensating delay element connected to receive an output of the second analog-to-digital converter and constructed to match the delay imposed by the apparatus of elements (b) through (i);
(1) an in-phase demodulator connected to:
  (1) receive, at a first input, an output of the compensating delay unit;
  (2) receive, at a second input, the second in-phase output of element (h); and
  (3) produce, at an output, an overall in-phase output of the apparatus; and
(m) an quadrature demodulator connected to:
  (1) receive, at a first input, the output of the compensating delay unit;
  (2) receive, at a second input, the fourth product
  (3) produce, at an output, an overall quadrature output of the apparatus;
the first and second Hilbert transformers each comprising:
(n) a first delay element connected to:
  (1) receive an input signal to the Hilbert transformer; and
  (2) produce an output signal which is the in-phase output signal of the Hilbert transformer;
(o) a second delay element connected to:
  (1) receive, as an input signal, the output signal of the first delay element; and
  (2) produce an output signal; and
(p) a subtractor connected to:
  (1) receive, at a minus terminal, the input signal to the Hilbert transformer;
  (2) receive, at a plus terminal, the output signal of the second delay element; and
  (3) produce, at an output terminal, a difference which is the quadrature output signal of the Hilbert transformer.

* * * * *

UNITED STATES PATENT AND TRADEMARK OFFICE
CERTIFICATE OF CORRECTION

PATENT NO. : 5,550,866
DATED : August 27, 1996
INVENTOR(S) : Stanley A. White

It is certified that error appears in the above-identified patent and that said Letters Patent is hereby corrected as shown below:

FIG. 3: Change elements 58 and 62 from double delay elements "$Z^{-2}$" to single delay elements "$Z^{-1}$".

Signed and Sealed this

Twenty-fifth Day of March, 1997

Attest:

BRUCE LEHMAN

Attesting Officer

Commissioner of Patents and Trademarks